Sept. 5, 1944. W. O. SNELLING 2,357,783
WEIGHING MACHINE
Filed Sept. 24, 1942 2 Sheets-Sheet 2
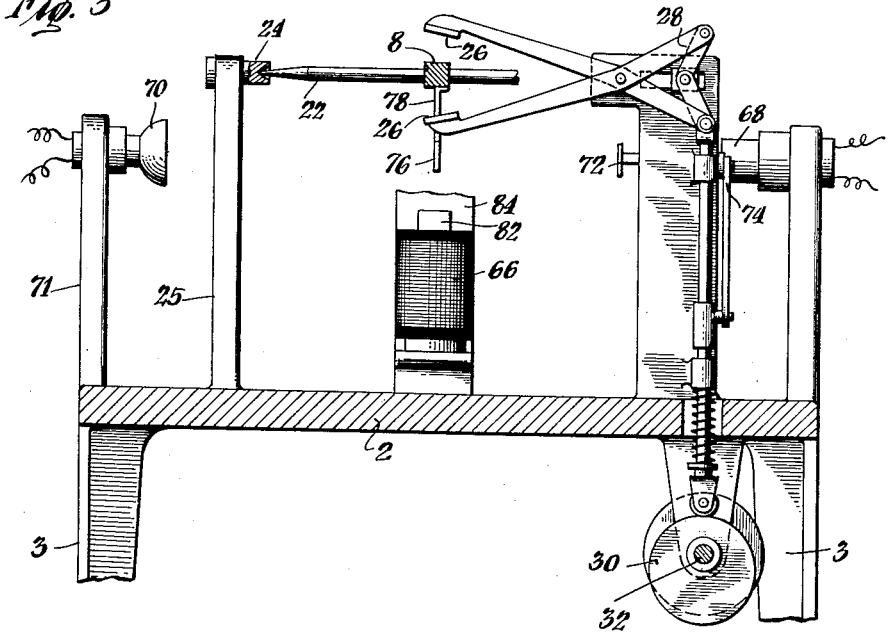
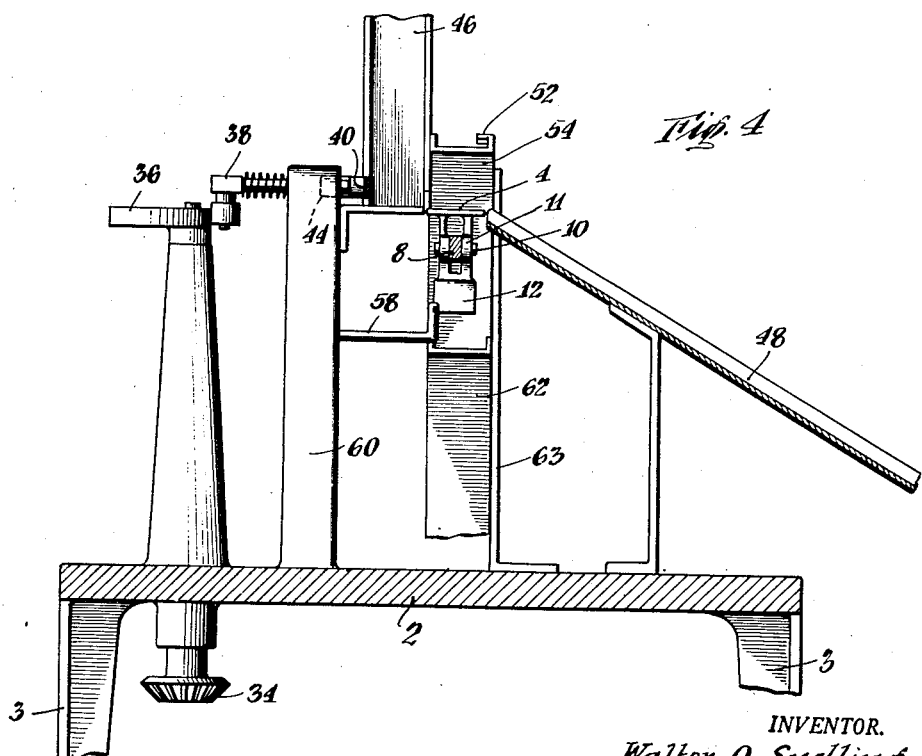
INVENTOR.
Walter O. Snelling
BY
Robert Calvert
ATTORNEY Patented Sept. 5, 1944

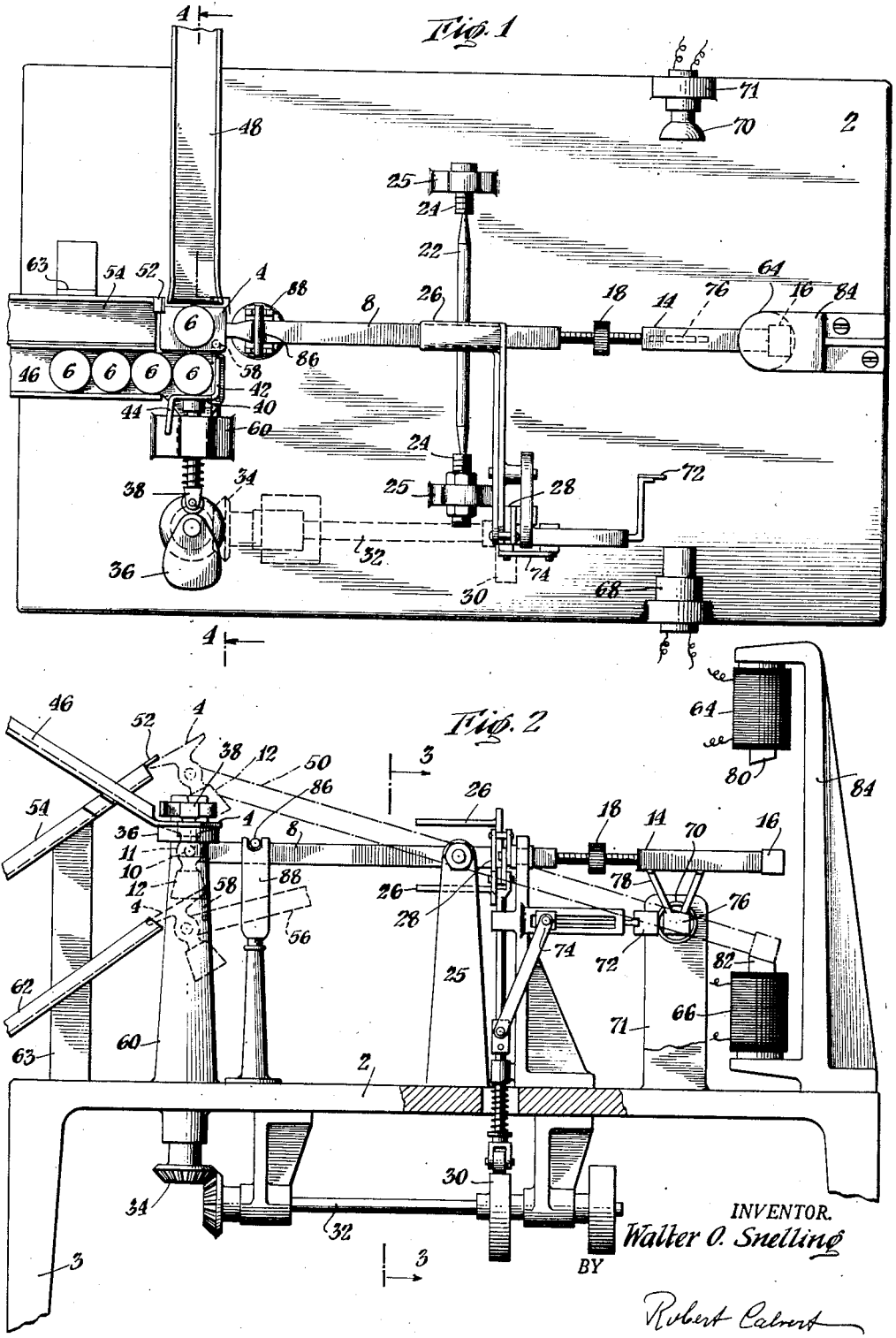

2,357,783

UNITED STATES PATENT OFFICE 2,357,783

WEIGHING MACHINE

Walter O. Snelling, Allentown, Pa., assignor to Trojan Powder Company, a corporation of New York Application September 24, 1942, Serial No. 459,583

3 Claims. (Cl. 209—121)

This invention relates to a weighing machine in the form of an improved balance.

The machine is particularly useful in the classification of objects by weight, so as to separate from each other objects that are overweight, underweight, or of the desired weight. For this reason the invention will be illustrated by detailed description in connection with the use of the machine in weight classification.

In the weight classification of caps, cartridges, and various relatively small solid objects of the explosives and other industries, there is need of a machine that will classify the objects quickly and automatically and that although rugged in construction is accurate in separating objects that differ only slightly in their weights. The present invention provides such a machine.

Briefly stated, the invention comprises a machine including the herein described combination of parts. More particularly, the invention comprises a weighing machine of the type of a balance including magnetic means for increasing the swing of the beam of the balance when the beam moves from its normal rest position and means synchronizing the alternate clamping and release of the balance beam with the feeding to the weighing platform of the object to be weighed and subsequent withdrawal of the feeding means. The invention comprises also means for tipping the weighing platform at certain definitely established positions, so as to cause discharge of underweight or overweight objects to separate receptacles. In a preferred embodiment, the invention includes the use as the said magnetic means of electromagnets activated by a photoelectric relay cell and a source of light from which the cell is shaded except at times when the beam of the balance is free to swing or actually swinging from its normal position of rest. In one embodiment of the invention, the feeding device is of special shape suggestive of a Z for controlling the movement of the object to be weighed and restricting the movement of the next object to be fed to the weighing machine until weighing of the first object is completed.

The invention will be described in detail in connection with the attached drawings to which reference is made.

In these drawings, Fig. 1 is a top plan view of the weighing machine; Fig. 2 is a front elevation; Fig. 3 is a vertical cross section on line 3—3 of Fig. 2; and Fig. 4 is a vertical cross section on line 4—4 of Fig. 1.

The figures are in part diagrammatic.

There are shown a support 2 for the weighing machine with legs 3 and upstanding elements for supporting various parts of the weighing machine.

The weighing machine is of the beam balance type and includes a balance beam, a member 4 such as a weighing platform to receive objects 6 that are to be weighed, an arm 8 of the balance beam for supporting the member 4 and means securing the said member to the arm of the balance, the said means including a pivotal mounting 10.

Disposed below said pivotal mounting is a mass adding member 12 which is secured in rigid manner to the object receiving member 4, as by a metal part such as 11 shown in Fig. 2

Disposed opposite the arm supporting the weighing platform 4 and constituting a part of the beam of the balance is the weight arm 14 of the balance. This arm includes a magnetic substance or part, such, for example, as the element 16 of iron, cobalt, or nickel. The arm includes also a weight setting device of which the nut and screw arrangement 18 are a suitable example.

The balance beam including the two arms is pivotally mounted on supporting rod 22 constituting a fulcrum, the said rod in turn being mounted at its ends in bearings 24 supported on pedestals 25.

Clamp 26 engages the balance arm and secures it approximately horizontally when it is in the position of rest.

The clamp is operated by the mechanism 28 which, in turn, is operated by cam 30 on the motor driven shaft 32. This shaft through part 34 and cam 36 actuates also the spring pushed feeder 38.

The use of the same shaft for the balance beam clamping mechanism and the feeder arrangement and the proper synchronizing of the actions of the cams 30 and 36 causes the balance beam to be clamped when the feeding member is pushing an object 6 on the weighing platform and then releases the clamp, so that the balance beam is free to swing, after the feeder is withdrawn from position above the member 4.

In more detail, the feeder includes a forward end that is substantially Z-shaped. A web element 40 serves to push the object 6 onto the weighing platform. The forwardly extending flange 42 restricts the movement (to the right in Fig. 1) of the object to be weighed and the rearwardly extending flange 44 of the Z serves as a shoulder to hold back the next object 6 until after the first object has been placed on the scale and the feeding mechanism returned to the starting position.

Chute 46 which slopes downwardly about the level of the object receiving platform 4 or slightly above feeds the objects 6 to the pusher part 40. Chute 48 slopes away from the platform 4 and at its end adjacent to the platform 4 is at about the same level or slightly lower, so that the movement by the pusher of the next object 6 in the direction away from the mounting of the driving cam 36 of Fig. 1 causes discharge of the weighed object 6 into chute 48 when the object 6 is of such weight that there is practically no swing of the balance beam 8 after it is released by clamp 26.

If, however, the object 6 is underweight, then the swing of the balance beam raises the weighing platform and the left arm of the balance (Fig. 2) to the position shown at 50 in Fig. 2. Here the edge of the weighing platform 4 that is the outer edge with respect to the center of the balance beam strikes the stop 52 on discharge chute 54 for underweight objects. Such an object on the tipped platform 4 then rolls or slides down the chute 54 to a receptacle (not shown) for such objects.

When, on the other hand, the object 6 is heavier than that required for the setting of the weighing machine, the object arm moves downwardly, say to position 56, where the weighing platform strikes stop 58 supported on the pedestal 60 of the machine. This stop 58 is below the inside edge of the weighing platform in the normal position of the platform, so that it causes the platform to tip outwardly and discharge the object on it into the chute 62 which leads to a receptacle (not shown) for overweight objects. Chutes 54 and 62 are supported upon the pedestal 63.

After the objects have been discharged, the clamping mechanism 26 restores the balance arms 8 and 14 to their normal position and the mass adding member 12 causes rotation of the assembly with platform 4 so that the platform is restored to a practically horizontal position.

In order that my machine may show a large amplitude of swing of the balance beam for minor differences of weight of the objects 6, the machine includes means for increasing the swing of the balance beam once it has been deflected somewhat from the normal position of rest. These means include electromagnets 64 and 66 of equal attraction for the weight arm, say magnets that when energized are of equal strength and are spaced at equal distances from the normal or rest position of the magnetic substance or element 16, one magnet being above and the other below the weight arm of the balance, so that the magnets are balanced. The magnetic substance may be concentrated in an element such as 16 or distributed in the weight arm continuously or at intervals.

The electromagnets are in series with a source of current and a conventional photoelectric relay cell 68 actuated by a light source 70 such as an incandescent electric light bulb assembly supported on stand 71; when light from lamp 70 strikes the relay 68, a circuit is made through the solenoids 64 and 66 which are thus energized indirectly by light from the source 70. This assembly constitutes means for energizing the magnets.

It is preferred that the electromagnets should be energized only when the weight arm 14 is swinging from its normal position of rest. For that reason there is provided one or two light cut-off members for obstructing at other times the path of light between the light source 70 and the photoelectric relay cell 68. One of these light cut-off members 72 is united to the device operating the balance beam clamp 26 and is thus synchronized with the action of the clamp. It is in the path of the light from part 70 to the cell 68 when the clamps are in clamping position and are holding the beam at rest but is removed from this path by the operation of mechanism 74 when the clamps are released, this being the condition shown in Fig. 2.

The other light cut-off member 76 is joined, as by a V-shaped bracket 78, to an arm of the balance and is in such position with respect to the balanced arm and the parts 70 and 68 that the member 76 shades the cell 68 from light 70 when the beam is in normal position. When, however, the clamps 26 are released and the beam of the balance swings a substantial distance either up or down from the horizontal, then the light 70 strikes the cell 68 and the electromagnets 64 and 66 are energized. They then attract the part 16 or magnetic substance elsewhere in the weight arm of the balance, the magnet which is the nearer, because of the swing of the weight arm towards that magnet, exerting the stronger magnetic attraction and pulling the weight arm in the direction of the magnet until the arm strikes a stop such, for example, as the parts 80 and 82 of the magnets themselves. The magnets in turn are firmly fixed in position as by support upon the bracket 84 which is secured to the base 2 of the weighing machine.

The operation of the machine will be evident from the description and statement of function of the parts that has been given.

The cam shaft 32 actuates the mechanism to clamp the balance beam and shade the photoelectric relay 68 and places the feeder mechanism, including the web 40, in the position shown in Fig. 1. The cam then moves the part 40 in the direction of the weighing platform 4 and centers an object 6 on the platform. The cam then withdraws the part 40 from over the weighing platform 4, releases clamp 26 from the balance beam, and at the same time withdraws light cut-off member 72 from the light path between source 70 and photoelectric cell 68.

The balance beam will now remain practically motionless in case object 6 is of the desired weight to balance the setting of the nut 18 on the weight arm of the balance. In that case, the cam repeats the cycle and the next forward stroke of the feeding part 40 causes a second object 6 to push the first object 6 off, the balance platform from which it slides or rolls down the discharge chute 48 for objects of the correct weight.

If, however, the object is either under or overweight then a swing of the balance beam is initiated, the light cut-off member 76 is moved from the path of the light from part 70 to part 68, the electromagnets 64 and 66 are energized and one of those magnets draws to it the weight arm of the balance so that the weighing platform 4 assumes either the upper or lower of the positions shown in dotted lines in Fig. 2 and the object 6 is rolled down the discharge chute for underweight or overweight objects. Operation of the cam then closes the clamp 26 and repeats the cycle.

Parts not shown, including details of cam construction for causing machine operations to occur in predetermined sequence, are conventional.

With a machine of the kind described, close grading of caps, cartridges, pelleted explosives, bullets, or other solid objects is made possible. The machine is fast in its operations and rugged in construction. A feature of the construction is the mounting of the balance beam on the machined rod 22 which passes through a hole in the balance beam and thus prevents shifting of the balanced beam from the center position as the beam is severely inclined, as shown, for example, in Fig. 2.

When it is desired that some variation be allowed in the weight of the accepted objects to be delivered to chute 48, means are provided for giving the balance a predetermined tolerance.

Thus a tolerance weight, as, for example, a short metal pin rider 86, is supported at a fixed level by suitable means, say by a divided yoke 88 provided with a slot so deep, so wide, and so directed, as illustrated, that the object arm (left arm in Fig. 2) of the balance may swing downward in the slot to the position for discharge of overweight objects into chute 62.

The object arm 8 of the balance is provided with a groove to receive the rider.

The level of the said yoke is so set that the yoke supports the pin when the balance beam is horizontal, or practically horizontal and the weighing pan 4 is therefore in position for discharge of an object 6 to the chute 48, but that the rider comes to be supported by the object arm 8 when the arm rises a very short distance above the normal position, say by a few hundredths of an inch or so.

Or, the yoke support may be slightly below such level, so that the balance normally supports the rider and the weight of the rider is taken by the yoke when the arm 8 of the beam swings downward through a very short distance.

If, with such an arrangement, the weight nut 18 is set for a slight underweight of the object 6 and the rider 86 is of such mass as to somewhat more than offset in its position on the beam the underweight, then there is a range of tolerance for which the balance beam will remain practically stationary and objects 6 be delivered as of the desired mass.

The mass adding member 12 is of weight just sufficient to maintain platform 4 normally in a horizontal position, so that the platform tips easily on striking a stop such as 62 or 58.

It will be understood also that it is intended to cover all changes and modifications of the examples of the invention herein chosen for the purpose of illustration which do not constitute departures from the spirit and scope of the invention, as defined in the appended claims.

What I claim is:

1. A weighing machine comprising a balance beam, a platform to receive objects to be weighed, an arm of the balance beam supporting the said platform, an oppositely extending weight arm of the beam, a magnetic portion of the balance beam, balanced electromagnets disposed above and below the said magnetic portion to increase the swing of the balance beam as the beam swings from the normal position of rest and towards one of the magnets during weighing by the machine, and means for energizing the electromagnets as the balance beam swings from its normal position of rest, the electromagnets being in non-energized condition when the balance beam is in the said normal position and the said means for energizing the magnets including an electric circuit and a photoelectric relay cell in series with the electromagnets, a source of light, a light cut-off member disposed normally between the source of light and the photoelectric cell, and means for removing the light cut-off member from between the light source and the photoelectric cell as the balance beam moves from its position of rest, so that the photoelectric cell is caused to energize the electromagnets.

2. A weighing machine comprising a beam balance including a weighing platform to receive objects to be weighed, an arm of the balance beam supporting the weighing platform, a magnetic portion of the balance beam, and magnets disposed above and below the said portion to increase the swing of the balance beam as the beam swings from the normal position of rest and towards one of the magnets during weighing by the machine, the said means for receiving objects to be weighed including a weighing platform, means mounting the said platform pivotally in normally horizontal position upon the arm supporting it, and means for tipping the said platform on its pivotal mounting, as the platform is raised or lowered to definite positions during making of weighings with the machine, so that objects fall from the platform, the said tipping means including a delivery chute for underweight objects having a stop which as the platform moves upwardly strikes an edge of the platform and causes a tipping of the platform in the direction of the chute, a second stop below the normal position of an edge of the said platform, and a discharge chute at approximately the level of the lower edge of the platform after tipping by the second stop so that, as the platform supporting an overweight object moves downwardly, the second stop strikes the edge of the platform and tips the platform in the direction of the discharge chute.

3. A weighing machine comprising a balance beam, a platform to receive objects to be weighed, an arm of the balance beam supporting the said platform, an oppositely extending weight arm of the beam, a magnetic portion of the balance beam, balanced electromagnets disposed above and below the said magnetic portion to increase the swing of the balance beam as the beam swings from the normal position of rest and towards one of the magnets during weighing by the machine, means for energizing the electromagnets as the balance beam swings from its normal position of rest, the electromagnets being in non-energized condition when the balance beam is in the said normal position, and also a delivery chute for underweight objects having a stop which as the said platform moves upwardly strikes an edge of the platform and causes a tipping of the platform in the direction of the chute; a second stop below the normal position of an edge of the said platform; a discharge chute at approximately the level of the lower edge of the platform after tipping by the second stop so that, as the platform supporting an overweight object moves downwardly, the second stop strikes the edge of the platform and tips the platform in the direction of the discharge chute; a pivotal mounting of the weighing platform to the balance beam; a mass adding member disposed below the pivotal mounting; means connecting the mass adding member rigidly to the said platform; means for feeding objects to be weighed to the weighing platform including an inclined feed chute and a reciprocating member of generally Z-shape having a forwardly extending flange limiting the movement in the direction of the flange of the object to be weighed, a web of the Z-shaped member serving as the pusher to move the objects onto the weighing platform, and a rearwardly extending flange of the Z-shaped member serving to prevent movement of a second object in the direction of the pusher until the first object is placed upon the platform and the pusher returned to its starting position for receiving the said second object; a tolerance weight; and means for supporting the tolerance weight at a fixed level just above the arm supporting the platform for the object to be weighed, so that the tolerance weight comes to be supported by the said arm as the arm rises, the said machine including an electric circuit and a photoelectric relay cell in series with the electromagnets, a source of light, a light cut-off member disposed normally between the source of light and the photoelectric cell, and means for removing the light cut-off member from between the light source and the photoelectric cell as the balance beam moves from its position of rest, so that the photoelectric cell is caused to energize the electromagnets.

WALTER O. SNELLING.